United States Patent Office 2,744,113
Patented May 1, 1956

2,744,113
1-ISONICOTINYL-2-ALKENYL-2-ALKYL-HYDRAZINE

Herman Herbert Fox, Passaic, N. J., assignor to Hoffmann-La Roche Inc., Roche Park, Nutley, N. J., a corporation of New Jersey No Drawing. Application June 1, 1954,
Serial No. 433,843

6 Claims. (Cl. 260—295)

This invention relates to novel chemical compounds useful in therapeutics. More particularly, the invention relates to a class of compounds which can be identified by the generic designation 1-isonicotinyl-2-lower alkenyl-2-lower alkylhydrazine, and which can be represented by the following general formula:

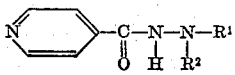

wherein $R^1$ represents a lower alkyl radical and $R^2$ represents a lower alkenyl radical.

Illustrative values of $R^1$ include methyl, ethyl, propyl and the like. Illustrative values of $R^2$ include vinyl, allyl, crotyl and the like. Compounds of the above formula are bases, and are capable of forming acid addition salts with organic and inorganic acids, e. g. hydrochloric acid, hydrobromic acid, hydriodic acid, sulfuric acid, phosphoric acid, tartaric acid, ethanesulfonic acid, oxalic acid and the like. Accordingly, the invention also includes acid addition salts of bases having the above general formula. A particularly preferred class of acid addition salts are those formed by bases of the above formula with the relatively non-toxic acids ordinarily employed in making pharmaceutically useful materials, such as hydrochloric acid, hydrobromic acid, tartaric acid, citric acid and the like. The compounds of the invention are useful as antituberculous agents.

A general process for preparing the compounds of the invention comprises reacting a 1-isonicotinyl-2-lower alkyl hydrazine with a lower alkenyl halide, preferably a chloride or a bromide, and preferably in the presence of an acid binding agent. An alternative process for preparing the compounds of the invention comprises reacting an isonicotinic acid halide, e. g. isonicotinyl chloride or isonicotinyl bromide, or an acid addition salt of an isonicotinic acid halide, with a 1-lower alkenyl-1-lower alkylhydrazine, preferably in the presence of an acid binding agent.

The invention is further disclosed in the following examples, which are illustrative but not limitative thereof:

Example 1

To a solution of 2.3 g. of sodium in 100 cc. of ethanol was added, with stirring, 15 g. of 1-isonicotinyl-2-methylhydrazine. When solution was complete, 8.5 cc. of allyl chloride was added with stirring and the mixture was refluxed for about 30 minutes. The reaction mixture was then filtered to remove the precipitated sodium chloride and the clear filtrate was evaporated under vacuum to leave an oil comprising 1-isonicotinyl-2-allyl-2-methylhydrazine. On treatment with ethanolic hydrogen chloride, the oil gave a crystalline precipitate of 1-isonicotinyl-2-allyl-2-methylhydrazine dihydrochloride. Upon recrystallization from isopropanol, the pure product was obtained in the form of white crystals which melted with decomposition at 162.5–163.5° C., corrected.

Example 2

To a solution of 2.3 g. of sodium in 100 cc. of ethanol was added with stirring 16.5 g. of 1-isonicotinyl-2-ethylhydrazine. When solution was complete, 8.5 cc. of allyl chloride was added with stirring and the resulting mixture was refluxed for about 20 minutes. The reaction mixture was then filtered to remove the precipitated sodium chloride and the clear filtrate was evaporated under vacuum to leave a red oil comprising 1-isonicotinyl-2 - allyl - 2 - ethylhydrazine, which on treatment with ethanolic hydrogen chloride gave a crystalline precipitate of 1-isonicotinyl-2-allyl-2-ethylhydrazine dihydrochloride. Upon recrystallization from a mixture of methanol and isopropanol, the pure product was obtained in the form of cream-colored crystals which melted with decomposition at 176.5–177.5° C., corrected.

Example 3

17.9 grams of 1-isonicotinyl-2-isopropylhydrazine were dissolved in a solution containing 2.3 grams of sodium metal in 100 cc. of absolute ethanol. 9 grams of allyl chloride were added to the solution and the mixture was refluxed for about 10 minutes. The reaction mixture was cooled, the sodium chloride which had formed was filtered off, and the ethanol was removed under vacuum. The oily residue comprising 1-isonicotinyl-2-allyl-2-isopropylhydrazine was dissolved in isopropanol, and an excess of ethanolic hydrogen chloride was added to the solution. The mixture was heated to boiling and then cooled with vigorous scratching to give a precipitate of 1-isonicotinyl-2-allyl-2-isopropylhydrazine dihydrochloride. Upon recrystallization from ethanol, the pure product was obtained in the form of white needles which melted with decomposition at 188.5–189.5° C.

The same compound was also obtained when 0.69 gram of lithium metal was employed in the place of the sodium metal.

This application is a continuation-in-part of my application Serial No. 275,250, filed March 7, 1952.

I claim:
1. A compound selected from the class consisting of 1-isonicotinyl-2-lower alkenyl-2-lower alkylhydrazine and acid addition salts thereof.
2. 1-isonicotinyl-2-allyl-2-methylhydrazine.
3. 1-isonicotinyl-2-allyl-2-ethylhydrazine.
4. 1-isonicotinyl-2-allyl-2-isopropylhydrazine.
5. An acid addition salt of 1-isonicotinyl-2-lower alkenyl-2-lower alkylhydrazine.
6. 1-isonicotinyl-2-lower alkenyl-2-lower alkylhydrazine.

References Cited in the file of this patent
FOREIGN PATENTS
176,215   Austria _____ Sept. 25, 1953

OTHER REFERENCES
Fox et al.: J. Org. Chem. 18:996 (August 1953).